United States Patent [19]

Coady et al.

[11] Patent Number: 4,608,409

[45] Date of Patent: Aug. 26, 1986

[54] POLYACRYLATED OLIGOMERS IN ULTRAVIOLET CURABLE OPTICAL FIBER COATINGS

[75] Inventors: Clive J. Coady, Hanover Park; John J. Krajewski, Wheeling; Timothy E. Bishop, Algonquin, all of Ill.

[73] Assignee: DeSoto, Inc., Des Plaines, Ill.

[21] Appl. No.: 731,888

[22] Filed: May 8, 1985

[51] Int. Cl.$^4$ .............................................. C08L 75/04
[52] U.S. Cl. .................................. 524/199; 428/375; 428/378; 428/392; 428/425.6; 524/287; 524/290; 524/317; 528/49; 252/182; 526/301
[58] Field of Search ............... 524/199, 287, 290, 317; 528/49; 428/375, 378, 392, 425.6; 252/182; 526/301

[56] References Cited

U.S. PATENT DOCUMENTS

| | | | |
|---|---|---|---|
| 4,097,439 | 6/1978 | Darling | 260/31.2 N |
| 4,198,200 | 4/1980 | Fonda et al. | 525/440 |
| 4,246,379 | 1/1981 | Howard | 525/440 |
| 4,254,230 | 3/1981 | Howard | 525/28 |

*Primary Examiner*—Maurice J. Welsh
*Attorney, Agent, or Firm*—Dressler, Goldsmith, Shore, Sutker & Milnamow, Ltd.

[57] ABSTRACT

An ultraviolet curing liquid coating composition is disclosed which, when cured with ultraviolet light in the presence of an appropriate photoinitiator, provides buffer coatings for optical glass fiber having adequate strength at room or expected elevated temperature and stability at such elevated temperature, a high index of refraction above 1.48, and a low tensile modulus which remains low to resist microbending difficulties down to around −60° C. This coating composition consists essentially of a linear polyacrylate-terminated polyurethane or polyurea oligomer having a room temperature tensile modulus of at least 100 psi., and a tensile modulus at −60° C. which is less than 175,000 psi., when capped with 2-hydroxyethyl acrylate and cured with ultraviolet light, in admixture with a liquid acrylate-functional material which does not increase the low temperature hardness and which provides the liquidity needed for coating application. The oligomer is instead capped with a monohydric polyacrylate to provide improved cure speed without eliminating resistance to low temperature microbending.

14 Claims, No Drawings

POLYACRYLATED OLIGOMERS IN ULTRAVIOLET CURABLE OPTICAL FIBER COATINGS

DESCRIPTION

TECHNICAL FIELD

This invention relates to polyacrylated oligomers in ultraviolet-curing coatings for optical fibers.

BACKGROUND ART

It is now well known to employ acrylate-terminated linear oligomers, especially polyurethane oligomers, in ultraviolet-curing coatings which are applied to optical glass fibers to protect the same. These oligomers, and mixtures thereof with appropriate monoethylenically unsaturated monomers, can be formulated to possess the low modulus at low service temperature needed to avoid microbending difficulties while still possessing sufficient strength at normal temperatures to resist the pressures encountered in cabling the coated fibers. However, these oligomers have been terminated with monoacrylates, such as 2-hydroxyethyl acrylate, and the resulting acrylated oligomers possess only moderate cure speed on exposure to ultraviolet radiation.

It is desired to point out that optical glass fibers are drawn from a specially prepared glass ingot one filament at a time. This means that a rather expensive production apparatus produces very little product per unit of time. To maximize production, it is desired to operate the apparatus as rapidly as possible consistent with the production of a good product. However, it is now possible to operate the glass drawing operation more rapidly than the ultraviolet cure of the applied coating or coatings, and this means that the optical fiber industry is pressuring the coating industry to supply ultraviolet-curing coatings which will cure more rapidly while still providing the combination of moderate modulus at low service temperature with reasonable room temperature strength which is essential to a good optical fiber coating. Moreover, there are other characteristics which a good optical fiber coating should possess, such as a high index of refraction above 1.48.

It is known that polyacrylates, including pentaerythritol triacrylate, can be incorporated into ultraviolet-curing coatings as a reactive diluent. This triacrylate serves many functions, one of which is to enhance cure speed. However, the coatings needed for optical fibers must maintain elastomeric properties at low temperatures, such as $-40°$ C., and preferably as low as $-60°$ C. so as to avoid microbending difficulties. Unfortunately, when a polyacrylate, such as pentaerythritol triacrylate, is added to the acrylate-terminated linear oligomers normally used, it produces harder and less rubbery cured coatings. This causes the tensile modulus at low temperature to increase rapidly as the polyacrylate content increases. As a result, the cured coatings containing the polyacrylate as a reactive diluent are not satisfactory for optical fiber coating.

DESCRIPTION OF INVENTION

In accordance with this invention, a linear oligomer which is adapted to provide a rubbery elastomeric coating suited to the coating of optical fiber when capped with a monohydric monoacrylate, is instead capped with a monohydric polyacrylate, preferably pentaerythritol triacrylate. It is found that the cure rate of the coating composition on exposure to ultraviolet light is markedly enhanced at the same time that the ultraviolet-cured coating characteristics remain rubbery and elastomeric at low temperature. If the oligomer which is capped with the monohydric polyacrylate was appropriate for the coating of optical glass fiber in an ultraviolet-curing process when capped with 2-hydroxyethyl acrylate, it remains suited to such use, but now the cure is much more rapid.

To more fully characterize the oligomers which are used in this invention, they are to provide a minimal acceptable tensile moldulus at room temperature (25° C.) of at least about 100 psi., preferably at least 200 psi. At the same time, these oligomers are to provide a maximum tensile modulus at $-60°$ C. of less than 175,000 psi., preferably less than 100,000. These characteristics are measured on a three mil film of cured oligomer. Whenever the oligomer provides this combination of cured characteristics when capped with 2-hydroxyethyl acrylate, as in the prior art, it can instead be capped as taught herein, and it will still be useful to provide the combination of physical characteristics which have been described.

The coating composition in this invention thus consists essentially of a linear acrylate-terminated polyurethane or polyurea oligomer in which the acrylate terminal groups are provided by a monohydric polyacrylate capping agent. In most instances, the resulting polyacrylate-terminated oligomer must be used in admixture with a liquid acrylate-functional material which does not increase the low temperature hardness and which provides the liquidity needed for coating application. This acrylate-functional liquid may be a monoacrylate monomer having a glass transition temperature below about 0° C. (preferably below $-20°$ C.) which provides the coating composition with a viscosity suitable for coating, or it may be a linear aliphatic diacrylate in which the two acrylate groups are separated by a chain of at least 6 carbon atoms or by a molecular weight of at least 400 up to about 4000.

It is desired to contrast the coatings of this invention with those of a similar buffer coating for optical glass fiber which contains much the same oligomer, but which is terminated with 2-hydroxyethyl acrylate instead of a monohydric polyacrylate, as in this invention. In the previous product, a three mil film was deposited on glass and exposed to 0.4 Joule of ultraviolet light. The free film removed from the glass surface was then boiled in methyl ethyl ketone solvent for 2 hours in a Sohxlet extractor, and it was found that 41.5% of the film dissolved. This provides a gel content of 58.5%. In contrast, a three mil film on glass in accordance with the Example of this invention provided hereinafter, using pentaerythritol triacrylate instead of 2-hydroxyethyl acrylate (slightly more monomer was used to provide viscosity control), was subjected to only 0.05 Joule of the same ultraviolet light. After boiling the free film for 2 hours in a Sohxlet extractor, it was found that only 28% of the film dissolved. This provides a gel content of 72%.

These results indicate that ⅛th the radiation exposure produced a significantly greater insolubilization. This is an astonishing improvement, particularly where the cured coatings remain elastomeric and resistant to microbending difficulties at low temperature.

The polyacrylate-terminated polyurethane or polyurea oligomer which provides the combination of low temperature softness with reasonable room temperature strength desirably has a molecular weight in the range of from about 2,000 to about 8,000 and includes from 4 to 10 urethane groups, it being permissible for a portion of these urethane groups to be replaced by urea groups. The urethane groups are formed by reaction of alcohols with isocyanate functionality, and when an amine is used instead of an alcohol, a urea group is formed instead of a urethane group. The urea group confers superior strength, so it is desired to include from 2 to 6 urea groups in the oligomer, and this may be done by using diamines instead of dialcohols to grow the linear oligomer chain.

These polyurethane compositions normally cure to have an index of refraction of about 1.54–1.55, and thus are especially suitable for use as a buffer coating on optical fiber. Of course, by appropriate monomer selection and by using appropriate oligomers, the coatings of this invention can be used to deposit somewhat harder and stronger coatings which can be used for topcoating.

While any linear oligomer of the character described can be used in this invention if it provides the physical characteristics specified herein when capped with 2-hydroxyethyl acrylate, it is preferably of special character so as to maximize the performance of the oligomer.

One preferred type of oligomer is based on a diisocyanate in which a linear aliphatic chain containing at least 6 carbon atoms separates the two isocyanate groups, as will be illustrated. This diisocyanate is reacted with a dihydric or diamino polyether or polyester containing alkylene groups having from 1 to 6 carbon atoms and a molecular weight in the range of 500 to 4000, to form a polyurethane diisocyanate which is then half end capped with an hydroxy acrylate and reacted with a $C_1$ to $C_4$ oxyalkylene diamine having a molecular weight of from 100 to 600 to consume the isocyanate functionality.

Referring more particularly to the diisocyanate in which a linear aliphatic chain containing at least 6 carbon atoms separates the two isocyanate groups, any long chain aliphatic diisocyanate can be used, such as trimethyl hexamethylene diisocyanate or 1,12-dodecyl diisocyanate. The preferred diisocyanates are dimer fatty acid diisocyanates. Dimer fatty acids are dicarboxylic acids formed by dimerizing fatty acids which usually contain 18 carbon atoms, and this provides a 36 carbon atom dicarboxylic acid. When these two terminal carboxylic acid groups are converted to isocyanate groups, the result is a $C_{36}$ diisocyanate.

The separation of the two isocyanate groups may include other groups in addition to the long carbon chain. Thus, the dimer fatty acids described above may be reacted with ethylene oxide to provide hydroxy ester groups, or with several moles of ethylene oxide to add ether groups, and then the hydroxy-terminated product so-provided can be reacted with excess diisocyanate to provide isocyanate terminal groups. Also, the two carboxy groups in the starting dimer fatty acid can be converted to amine groups in known fashion to form a diamine. The resulting diamine can be reacted with excess diisocyanate to provide a diisocyanate which still contains the 36 carbon atoms chain which has been found to provide the new properties desired herein.

The above long chain aliphatic diisocyanate is reacted with a dihydric or diamino polyether or polyester containing alkylene groups having from 1 to 6 carbon atoms (preferably 2 or 3 carbon atoms) and a molecular weight in the range of 500 to 4000. It is preferred to employ polyoxyalkylene glycols having a molecular weight in the range of 1000 to 3000, and in which the alkylene groups contain from 1–4 carbon atoms. These are illustrated by polyoxyethylene glycol having a molecular weight of 1500, 2000 or 2500, polyoxypropylene glycol of corresponding molecular weight, and polytetramethylene glycol of molecular weight 1000. Polyoxyethylated or polyoxypropylated diols, such as butane diol, hexane diol, polyoxyethylene glycol or polyoxypropylene glycol, are also useful. A suitable diamino polyether is polyoxypropylene diamine having a molecular weight of about 2000.

All molecular weights herein are calculated from the reactivity of the compounds based on their theoretical formulas, unless otherwise specified.

Polyesters which may be used are illustrated by polycaprolactone glycols, such as the commercially available Tone 0240 from Union Carbide Corporation which is a polycaprolactone glycol having a molecular weight of about 2000.

The reaction between the previously described diisocyanate, which is used in an excess of preferably one mole of diisocyanate per hydroxy group, and the glycol forms a polyurethane diisocyanate, as is well known.

The above polyurethane or polyurea diisocyanate is then half end capped with a monohydric polyacrylate, such as the preferred pentaerythritol triacrylate. Other monohydric polyacrylates which may be used are illustrated by glycerin diacrylate, trimethylol propane diacrylate, the dimer of pentaerythritol triacrylate having a single hydroxy group, and the diacrylate of propoxylated trimethylol propane having a molecular weight of about 355. All of these will considerably speed the ultraviolet cure, but they will not unduly increase the tensile modulus at temperatures of −40° C. down to −60° C.

The half end capped diisocyanate is preferably reacted with a $C_1$ to $C_4$ oxyalkylene diamine having a low molecular weight of from 100 to 600 to consume the remaining isocyanate functionality. The sequence of reactions is not important, for end capping can precede, follow or be simultaneous with the reaction with the diamine. As is well known, the diamine will form two urea groups, one from each of the two amine groups, to chain extend the half end capped diisocyanate (which is an unsaturated monoisocyanate). Typical diamines are amine-terminated polyethers, such as polyoxyethylene diamine, or preferably polyoxypropylene diamine, with the polyether chain providing the bulk of the needed molecular weight. These are specifically illustrated by polyoxypropylene diamine of molecular weight 200 and 400 and by polyoxyethylene diamine of molecular weight 300.

The low molecular weight diamine serves to decrease the low temperature strength without significantly changing the properties at room temperature, so its function herein is important and of surprising character.

When the molecular weight is between about 100 and about 600, a single diamine can be the only material reacted with the diisocyanate, other than the capping agent.

The liquid monoacrylate monomer having a low glass transition temperature is used to confer softness and also to modify the normally solid polyacrylate polyurethane polyurea to provide the coating composition with an appropriate coating viscosity. In this invention it is found that the polyacrylated polyurethane polyureas in combination with low glass transition temperature monomer cure, on ultraviolet exposure in the presence of appropriate photoinitiators, to provide soft coatings which retain a moderately low modulus down to very low temperature.

The glass transition temperature of the monomer is the glass transition temperature of a homopolymer of the monomer, and this is a conventional identification of the character of a monomer. Suitable low glass transition temperature monomers are illustrated by ethoxyethoxyethyl acrylate, phenoxyethyl acrylate, butoxyethyl acrylate, 2-hydroxyethyl acrylate, and the like. Ethoxyethoxyethyl acrylate is preferred, as will be illustrated in the Example.

It is also possible to include, especially when the coating is to be used as a single coating without any topcoat, a small proportion of a liquid monomer having a high glass transition temperature, preferably above about 55° C., these being illustrated by dimethyl acrylamide, N-vinyl pyrrolidone, isobornyl acrylate, acrylic acid and dicyclopentenyl acrylate. If topcoat application is intended, these high glass transition temperature monomers would be used in an amount of from about 15% to about 45%.

Good resistance to low temperature microbending can also be introduced by including in the liquid mixture applied to the glass filament a relatively high molecular weight liquid linear aliphatic diacrylate. In this diacrylate, the two acrylate groups are separated by a linear chain containing at least 6 carbon atoms or, where less than 6 carbon atoms are present in the chain, that chain has a molecular weight of from 400 to about 4000, preferably from 600 to 2500. Polyoxyalkylene glycol diacrylates are preferred, especially polyoxybutylene glycol diacrylates having a molecular weight of from 800 to 2000. These linear diacrylates are preferably used together with the acrylate-terminated oligomers containing a long chain diisocyanate, as previously disclosed.

Commercially available products which may be used as the liquid linear aliphatic diacrylate component are Chemlink products 9000 and 9001 as well as Chemlink 2000. These Chemlink products are supplied by Sartomer Company, a division of Atlantic Richfield, Westchester PA, The coating compositions of this invention are intended to be cured with ultraviolet light, so photoinitiators are normally present in an amount of from 0.5% to 8%, preferably from 2% to 5%. These are conventional components of ethylenically unsaturated coatings which cure an exposure to ultraviolet light. The usual photoinitiators are ketonic, such as benzophenone, acetophenone, diethoxy acetophenone, m-chloroacetophenone, propiophenone, thioxanthone, benzoin, benzil, anthraquinone, and the like. The preferred photoinitiator is 2,2-dimethoxy 2-phenyl acetophenone which is available in commerce under the trade designation Irgacure 651 from Ciba Geigy, Ardsley, NY. These photoinitiators are used alone or in admixture with one another, and amines, like diethyl amine, can be added as a photosensitizer, though this is not normally needed.

The coating compositions of this invention are normally free of volatile organic solvents because these would have to be evaporated prior to ultraviolet exposure, which would slow the cure.

EXAMPLE 180.4 grams of dimer $C_{36}$ fatty acid diisocyanate (Henkel Corporation, Minneapolis Minn. product DDI 1410 may be used), and 0.25 gram of dibutyl tin dilaurate are charged to a reactor where they are blanketed with nitrogen gas and stirred while heating to 55° C.–60° C. There is then added to the reactor at 60° C. over a 1½ hour period, 144.20 grams of polypropylene glycol having an average molecular weight of about 1,000. The mixture so-formed contains 2 moles of diisocyanate per mole of the glycol and is stirred for an additional 1½ hour to complete the reaction between the hydroxy and isocyanate functionalities.

44.8 grams of pentaerythritol triacrylate, 50.0 grams of ethoxyethoxyethyl acrylate, and 0.25 gram of phenothiazine are then added over a 20 minute period at 55° C. and stirring is continued for an additional hour to end cap half of the diisocyanate-terminated polyurethane which is present.

50.0 grams of ethoxyethoxyethyl acrylate and 30.1 grams of a polyoxyethylene diamine having a molecular weight of about 400 (Texaco product Jeffamine D400 may be used) are then mixed together and added to the reactor and stirred at 60° C. until residual isocyanate functionality is no longer detectable. The added diamine provides one amine group per NCO group remaining in the reaction mixture, and the result is a polyacrylate-functional polyurethane polyurea oligomer prepared from long-chain aliphatic materials.

The above product is mixed with 3% by weight of 2,2-dimethoxy 2-phenyl acetophenone and coated upon glass to form a film 3 mil thick which is cured by exposure to ultraviolet light using medium pressure mercury vapor lamps which supply ultraviolet light having a wavelength ranging from about 260 to about 380 nanometers. The ultraviolet dose is about 3.5 Joules/cm$^2$.

The cured films are then stripped from the glass support and tested to show a tensile strength at 25° C. of 167 psi. (the tensile modules is 300 psi.) and an elongation of 48%. At −60° C. the tensile strength was 5333 psi. (the tensile modulus is 149,495 psi.) and the elongation was 23%. These properties are reasonably effective in avoiding microbending difficulties at −60° C. while the room temperature properties provide acceptable strength. The compositions are stable at 130° F.

The coatings of this invention are applied to freshly drawn optical glass fiber having a diameter of about 125 microns in a thickness of about 125 microns and are cured by passing the coated fiber through two tandemly arranged 10 inch 300 watts medium pressure vapor lamp at 3.0 meters per second.

Example 1 is repeated replacing the pentaerythritol triacrylate used in that example with an equimolar proportion of a diacrylate ester of propoxylated trimethylol propane (Photomer 4152 from Diamond Shamrock Company may be used). Corresponding results are obtained.

What is claimed is:

1. An ultraviolet curing liquid coating composition which, when cured with ultraviolet light in the presence of an appropriate photoinitiator, provides a buffer coating for optical glass fiber consisting essentially of a linear polyacrylate-terminated polyurethane or polyurea oligomer in admixture with a liquid acrylate-functional material which does not increase the low temperature hardness and which provides the liquidity needed for coating application, said polyacrylate-terminated polyurethane or polyurea oligomer having a room temperature tensile modulus of at least 100 psi., and a tensile modulus at −60° C. which is less than 175,000 psi., when capped with 2-hydroxyethyl acrylate and cured with ultraviolet light, said oligomer being capped with a monohydric polyacrylate.

2. A coating composition as recited in claim 1 in which said acrylate-functional liquid is a monoacrylate monomer having a glass transition temperature below about 0° C.

3. A coating composition as recited in claim 1 in which said acrylate-functional liquid is a linear aliphatic diacrylate in which the two acrylate groups are separated by a chain of at least 6 carbon atoms or by a molecular weight of from 400 to about 4000.

4. A coating composition as recited in claim 1 in which said diisocyanate includes a linear aliphatic chain containing at least 6 carbon atoms separating the two isocyanate groups, and this diisocyanate is reacted with a dihydric or diamino polyether or polyester containing alkylene groups having from 1 to 6 carbon atoms and a molecular weight in the range of 500 to 4000, to form a polyurethane or polyurea diisocyanate which is half end capped with said monohydric polyacrylate and reacted with a $C_1$ to $C_4$ oxyalkylene diamine having a molecular weight of from 100 to 600 to consume the isocyanate functionality.

5. A coating composition as recited in claim 4 in which said diisocyanate is provided by dimer fatty acid diisocyanate.

6. A coating composition as recited in claim 5 in which said dimer fatty acid diisocyanate contains 36 carbon atoms.

7. A coating composition as recited in claim 5 in which said diisocyanate is reacted with a polyether which is a polyoxyalkylene glycol having a molecular weight in the range of 1000 to 3000.

8. A coating composition as recited in claim 7 in which said oxyalkylene group contains 2 or 3 carbon atoms.

9. A coating composition as recited in claim 8 in which said monohydric polyacrylate is pentaerythritol polyacrylate.

10. A coating composition as recited in claim 1 in which said low glass transition temperature monomer is selected from the group consisting of ethoxyethoxyethyl acrylate, phenoxyethyl acrylate, butoxyethyl acrylate, and 2-hydroxyethyl acrylate.

11. An ultraviolet curing liquid coating composition which, when cured with ultraviolet light in the presence of an appropriate photoinitiator, provides a buffer coating for optical glass fiber consisting essentially of a linear polyacrylate-terminated polyurea polyurethane oligomer in admixture with a liquid acrylate-functional material selected from the group consisting of ethoxyethoxyethyl acrylate, phenoxyethyl acrylate, butoxyethyl acrylate, and 2-hydroxyethyl acrylate to provide the liquidity needed for coating application, said polyacrylate-terminated polyurea polyurethane oligomer having a room temperature tensile modulus of at least 200 psi., and a tensile modulus at −60° C. which is less than 100,000 psi., when capped with 2-hydroxyethyl acrylate and cured with ultraviolet light, said oligomer being capped with a monohydric polyacrylate.

12. A coating composition as recited in claim 11 in which said monohydric polyacrylate is pentaerythritol polyacrylate.

13. An optical glass fiber coated with an ultraviolet-cured coating of the composition of claim 1.

14. An optical glass fiber coated with an ultraviolet-cured coating of the composition of claim 13.

* * * * *